United States Patent [19]
Goetz

[11] Patent Number: 5,386,768
[45] Date of Patent: Feb. 7, 1995

[54] APPARATUS FOR DEWATERING SLUDGE

[75] Inventor: Heinz Goetz, Pittsburgh, Pa.

[73] Assignee: Roediger Pittsburgh, Inc., Allison Park, Pa.

[21] Appl. No.: 37,252

[22] Filed: Mar. 26, 1993

[51] Int. Cl.⁶ .......................... B30B 15/14; B30B 9/24
[52] U.S. Cl. ..................................... 100/50; 100/116; 100/118; 100/152
[58] Field of Search ............... 100/37, 116, 118, 122, 100/131, 152, 222, 246, 137, 52, 151, 50

[56] References Cited

U.S. PATENT DOCUMENTS

| | | | |
|---|---|---|---|
| 772,472 | 10/1904 | Neill | 100/116 X |
| 3,230,866 | 1/1966 | Branders et al. | 100/151 X |
| 3,688,686 | 9/1972 | Ligh | 100/52 |

FOREIGN PATENT DOCUMENTS

| | | | |
|---|---|---|---|
| 0194996 | 9/1986 | European Pat. Off. | 100/118 |
| 59-159299 | 9/1984 | Japan | 100/118 |
| 59-163099 | 9/1984 | Japan | 100/118 |
| 29353 | 8/1910 | Sweden | 100/222 |
| 1032933 | 6/1966 | United Kingdom | 100/118 |

*Primary Examiner*—Stephen F. Gerrity
*Attorney, Agent, or Firm*—Ansel M. Schwartz

[57] ABSTRACT

An apparatus for dewatering sludge. The dewatering apparatus has a pressure plate device for compressing the sludge on a surface such that the sludge is dewatered. The dewatering apparatus also has a device for confining the sludge within a predetermined area on the surface as the pressure plate device compresses the sludge. The confining device is disposed adjacent to the pressure plate device. Preferably, the dewatering apparatus also has a device for transporting the sludge on a belt to the pressure plate device. The belt is preferably a porous belt filter cloth. For instance, the transporting device can have a first conveyor belt device and a second conveyor belt device having the belt. The first conveyor belt device transports partially dewatered sludge, or sludge cake, from a belt filter press to the second conveyor belt. The second conveyor belt device transports the sludge from the first conveyor belt device to the pressure plate device on the belt. Preferably, the pressure plate device has a first plate disposed on a first side of the belt and a second plate disposed in an opposing relationship with the first plate on a second side of the belt. Preferably, the second plate has a plurality of perforations through which water can drain. Preferably, a drain is disposed below the second plate for collecting water from the plurality of perforations.

10 Claims, 3 Drawing Sheets

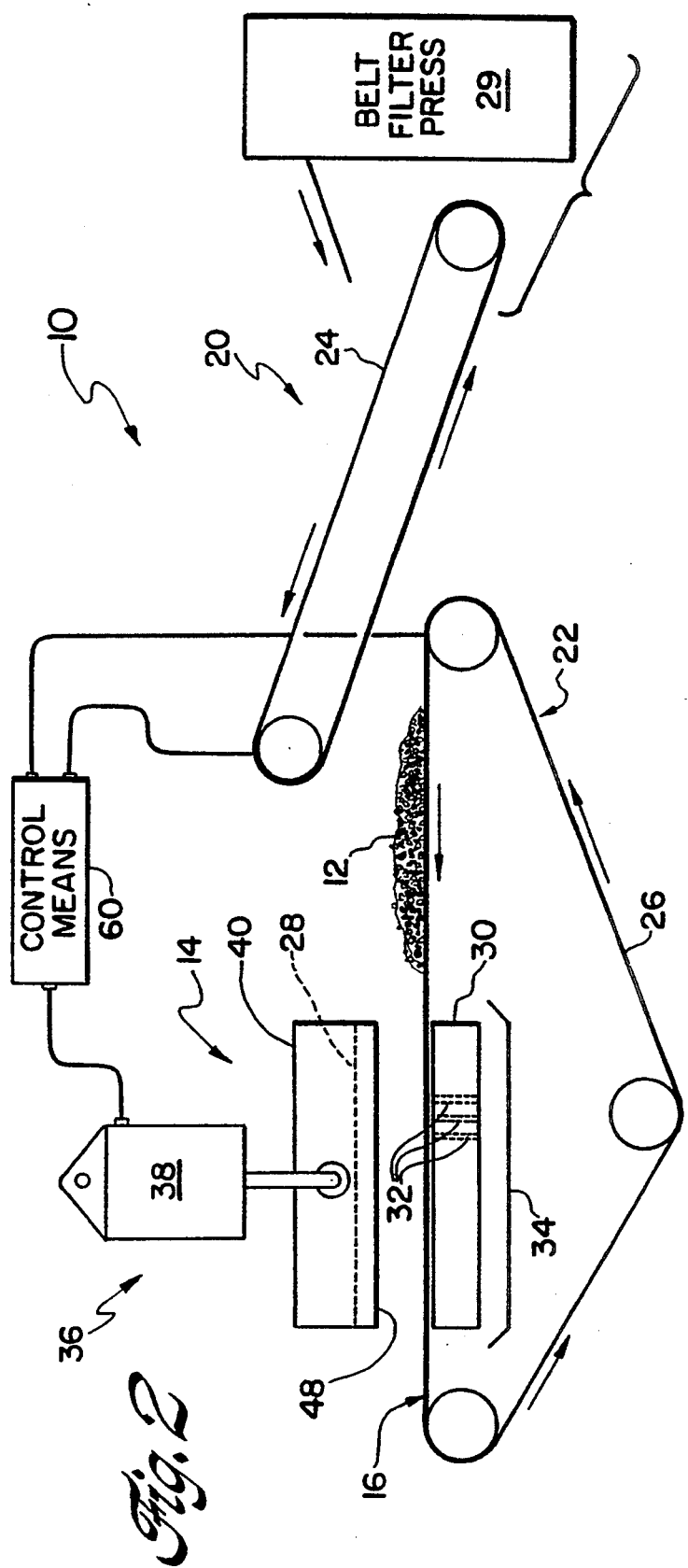
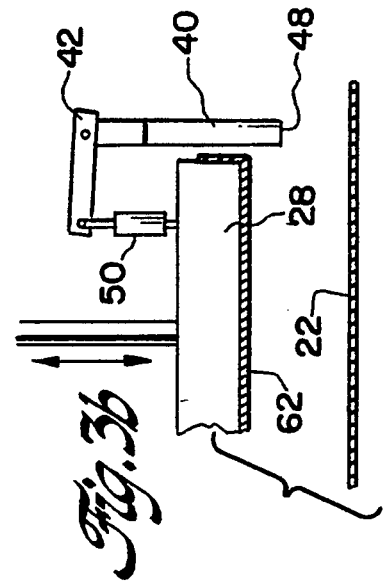
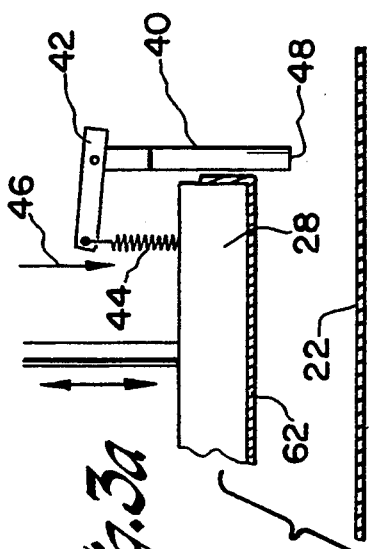

APPARATUS FOR DEWATERING SLUDGE

FIELD OF THE INVENTION

The present invention is related in general to an apparatus for dewatering sludge. More specifically, the present invention is related to an apparatus and associated method of dewatering sludge cake by compressing the sludge cake on a surface with the sludge cake being confined on the surface.

BACKGROUND OF THE INVENTION

For removing liquid from masses having great liquid content, it is common to subject the masses to a squeezing in a belt press. In such a press, the material is carried between a pair of endless dewatering belts running substantially parallel to each other through a series of rollers. An example of such squeezing apparatuses are disclosed in U.S. Pat. No. 4,543,880, U.S. Pat. No. 4,557,833 and U.S. Pat. No. 5,113,999. These devices move the material, on belts, through sets of mutually cooperating rollers, in which high transient line pressures are applied on the masses. After this liquid extraction process is completed, the dewatering belts are separated by a pair of rollers rotating in opposite directions. In this manner, the matter is expelled from between the dewatering belts and thus from the belt press for further processing. The sludge matter expelled from the belt filter press is commonly referred to as sludge cake. The sludge cake though dewatered still has a significant water content. It is desirable to remove as much of this water as possible. The present invention is essentially an add-on to a belt press for removing water from sludge cake.

SUMMARY OF THE INVENTION

The present invention is an apparatus for dewatering sludge. The dewatering apparatus comprises pressure plate means for compressing the sludge on a surface such that the sludge is dewatered. The dewatering apparatus also comprises means for confining the sludge within a predetermined area on the surface as the pressure plate means compresses the sludge. The confining means is disposed adjacent to the pressure plate means. Preferably, the dewatering apparatus also comprises means for transporting the sludge on a belt to the pressure plate means. The belt is preferably a porous belt filter cloth. For instance, the transporting means can comprise a first conveyor belt device and a second conveyor belt device having the belt. The first conveyor belt device transports partially dewatered sludge, or sludge cake, from a belt filter press to the second conveyor belt. The second conveyor belt device transports the sludge from the first conveyor belt device to the pressure plate means on the belt.

Preferably, the pressure plate means comprises a first plate disposed on a first side of the belt and a second plate disposed in an opposing relationship with the first plate on a second side of the belt. Preferably, the second plate has a plurality of perforations through which water can drain. Preferably, a drain is disposed below the second plate for collecting water from the plurality of perforations.

Preferably, the pressure plate means comprises means for moving the first plate towards the second plate such that the sludge on the belt is compressed therebetween. For instance, the moving means can comprise a plate piston which, as is well known in the art, can be pneumatically or hydraulically activated.

Preferably, the confining means comprises a sealing frame which surrounds the perimeter of the first plate and seals against the belt to confine the sludge as the first plate moves to compress the sludge. Preferably, the sealing frame is attached to the first plate with a plurality of linkages which allow the sealing frame to move relative to the first plate.

The present invention is also a method of dewatering sludge. The method comprises the step of providing a portion of sludge on a surface. Then, there is the step of surrounding the sludge with a sealing frame in contact with the surface. Next, there is the step of compressing the sludge on the surface with the sludge being confined on the surface by the sealing frame.

Preferably, the providing step includes the step of transporting the sludge on a belt. Preferably, the transporting step includes the steps of depositing a portion of sludge on the belt and moving the belt until the sludge is disposed beneath the sealing frame.

BRIEF DESCRIPTION OF THE DRAWINGS

In the accompanying drawings, the preferred embodiment of the invention and preferred methods of practicing the invention are illustrated in which:

FIG. 2 is a schematic representation showing a side view of the apparatus for dewatering sludge.

FIGS. 3a and 3b are schematic representations showing two embodiments of linkages for connecting and allowing movement between the sealing frame and the first plate.

DESCRIPTION OF THE PREFERRED EMBODIMENT

Figure 1:
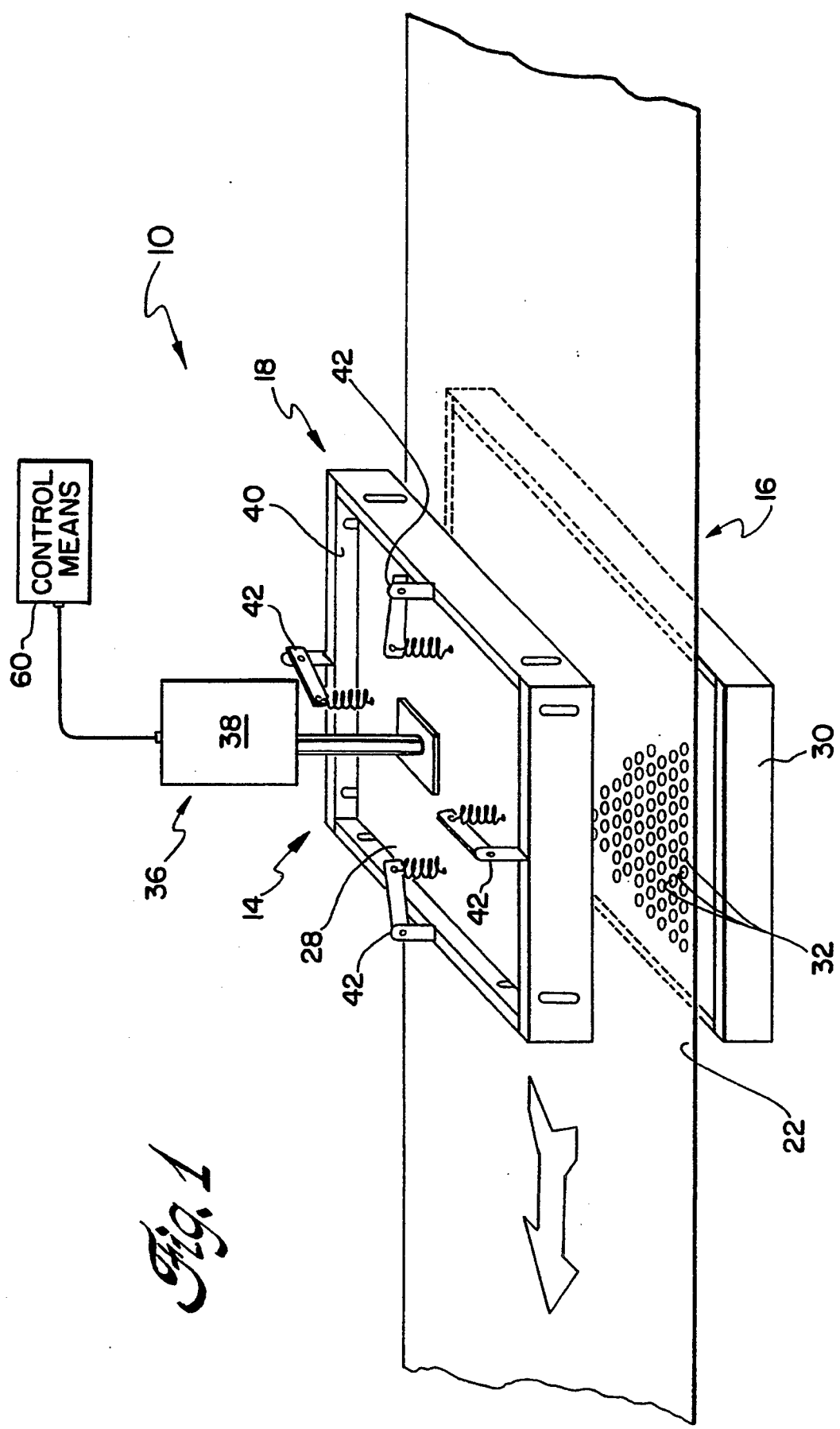
FIG. 1 is a schematic representation showing a perspective view of the apparatus for dewatering sludge.

Referring now to the drawings wherein like reference numerals refer to similar or identical parts throughout the several views, and more specifically to FIGS. 1 and 2 thereof, there is shown an apparatus 10 for dewatering sludge 12. The dewatering apparatus 10 comprises pressure plate means 14 for compressing the sludge 12 on a surface 16 such that the sludge 12 is dewatered. The dewatering apparatus 10 also comprises means 18 for confining the sludge 12 within a predetermined area on the surface 16 as the pressure plate means 14 compresses the sludge 12. The confining means 18 is disposed adjacent to the pressure plate means 14. Preferably, the dewatering apparatus also comprises means 20 for transporting the sludge 12 on a belt 22 to the pressure plate means 14. The belt 22 is preferably a porous belt filter cloth which is well known in the art of sludge dewatering. For instance, as shown in FIG. 2, the transporting means 20 can comprise a first conveyor belt device 24 and a second conveyor belt device 26 having the belt 22. The first conveyor belt device 24 transports partially dewatered sludge 12, or sludge cake, from a belt filter press 29 to the second conveyor belt 26. The second conveyor belt device 26 transports the sludge 12 from the first conveyor belt device 24 to the pressure plate means 14 on belt 22.

Preferably, the pressure plate means 14 comprises a first plate 28 disposed on a first side of the belt 22 and a second plate 30 disposed in an opposing relationship with the first plate 28 on a second side of the belt 22. Preferably, the second plate 30 has a plurality of perforations 32 through which water can drain. Preferably, as shown in FIG. 2, a drain 34 is disposed below the second plate 30 for collecting water from the plurality of perforations 32.

Preferably, the pressure plate means 14 comprises means 36 for moving the first plate 28 towards the second plate 30 such that the sludge 12 on the belt 22 is compressed therebetween. For instance, the moving means 36 can comprise a plate piston 38 which, as is well known in the art, can be pneumatically or hydraulically activated.

Figure 4A:
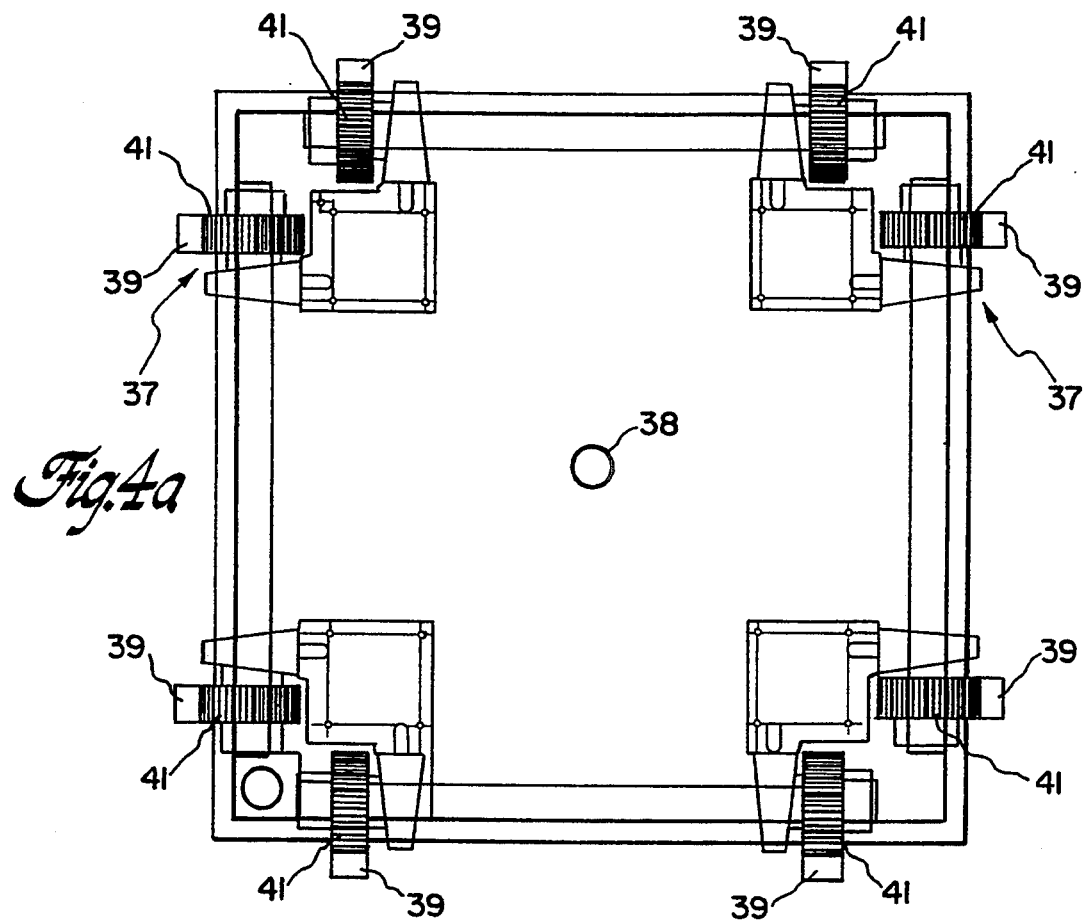
FIGS. 4a and 4b are schematic representations showing a preferred embodiment of the pressure plate with a rack and pinion assembly.
Figure 4B:
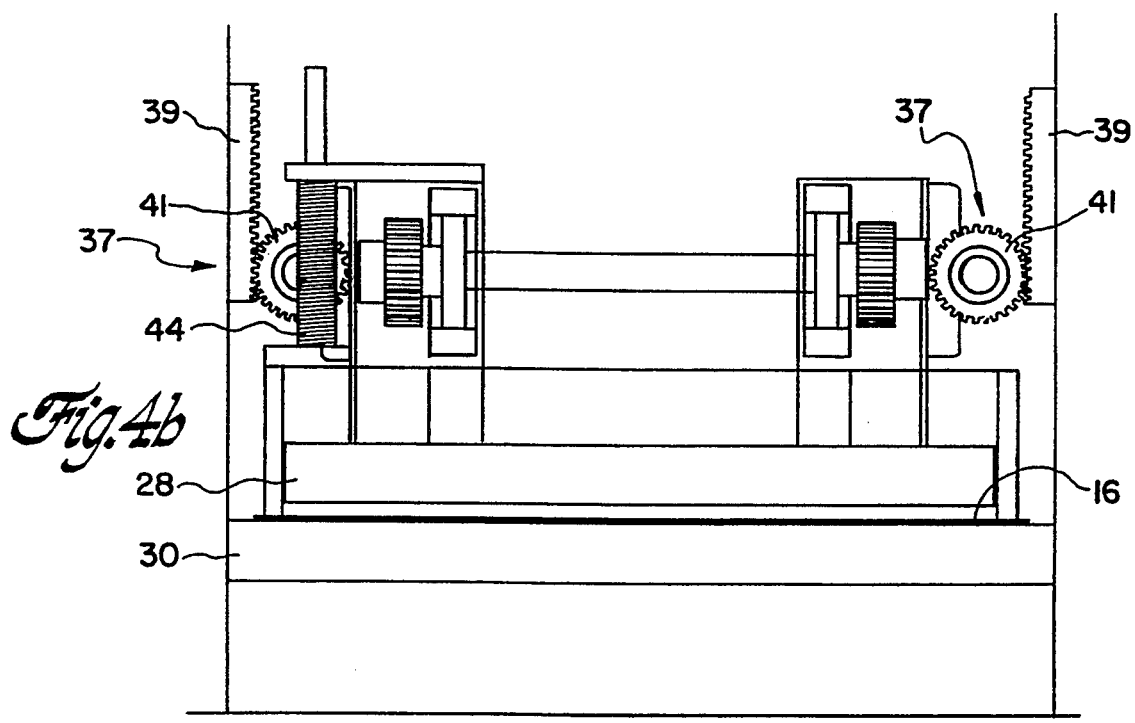

As shown in FIGS. 4a and 4b, the moving means 36 can comprise a rack and pinion assembly 37 to ensure uniform pressure on the sludge between the pressure plates 28, 30. The rack and pinion assembly 37 preferably comprises eight racks 39, disposed adjacent to the pressure plate means 14, and eight respective pinions 41 connected to the first plate 28, two on each side. The piston 38 connects to the center of first plate 28 and causes the first plate 28 to move up and down while being guided by the rack and pinion assembly 37.

Preferably, the confining means 18 comprises a sealing frame 40 which surrounds the perimeter of the first plate 28 and seals against the belt 22 to confine the sludge 12 as the first plate 28 moves to compress the sludge 12.

Preferably, the sealing frame 40 is attached to the first plate 28 with a plurality of linkages 42 which allow the sealing frame 40 to move relative to the first plate 28. In one embodiment, and as shown in FIG. 3a, each linkage 42 is comprised of a spring 44 for biasing the sealing frame 40 in a first direction, as referenced by arrow 46, relative to the first plate 28. In this manner, as the first plate 28 is lowered by the plate piston 38, the bottom 48 of the sealing frame 40 initially contacts the belt 22 to make a seal around the sludge 12. Further downward motion of the first plate 28 causes the spring 44 to stretch thereby providing an increasing downward force to the stationary sealing frame 40 which acts to increase the sealing force against the belt 22.

Alternatively, as shown in FIG. 3b, each linkage 42 comprises an actuator 50 for controlling movement of the sealing frame 40 relative to the first plate 28. For instance, the actuators 50 can be pistons which are pneumatically or hydraulically activated. In this embodiment, the seal force of the sealing frame 40 against the belt 22 can be adjustably controlled by altering the pressure within the pistons. It should be appreciated that the actuators 50 can also comprise mechanical actuators, such as worm gears.

Preferably, the first plate 28 has a rectangular shape and there are four linkages 42, one on each side of the first plate 28. Alternatively, there can be eight linkages, with two linkages 42 on each side of the first plate 28.

Preferably, the transporting means 20 comprises control means 60 for automatically starting the second conveyor belt device 26 when a predetermined portion of sludge 22 is deposited on the belt 22 from the first conveyor belt 24. Preferably, the control means also comprises means for stopping the belt 22 when the portion of sludge 22 is disposed between the first and second plates 28, 30. For instance, the control means 60 can comprise a timer and/or optical limiters for sensing the sludge 12. Preferably, the moving means 36 comprises means for releasing the first plate 28 from the sludge 12 when a predetermined pressure is achieved on the sludge 12. For instance, a pressure sensor in communication with the piston 38 can communicate with the control means 60. Once a desired pressure is reached in the piston 38, the control means 60 causes the piston 38 to retract to a starting position. Preferably, as shown in FIGS. 3a and 3b, the first plate 28 is lined with a section 62 of belt filter cloth for allowing the first plate 28 to release from the compressed sludge 12 without any of the sludge 12 sticking to it.

The present invention is also a method of dewatering sludge. The method comprises the step of providing a portion of sludge on a surface. Then, there is the step of surrounding the sludge with a sealing frame in contact with the surface. Next, there is the step of comprising the sludge on the surface with the sludge being confined on the surface by the sealing frame. Preferably, the providing step includes the step of transporting the sludge on a belt. Preferably, the transporting step includes the steps of depositing a portion of sludge on the belt and moving the belt until the sludge is disposed beneath the sealing frame.

In the operation of the preferred embodiment, and with reference to FIGS. 1 and 2, sludge cake 12 exits a belt filter press 29, such as that described in U.S. Pat. No. 5,113,999, incorporated by reference. Though, it should be appreciated that the belt filter press can be substituted with a variety of dewatering devices, such as centrifugal or vacuum type dewatering devices. The first conveyor belt device 24 transports the sludge cake 12 from the belt filter press 29 to the belt 22 of second conveyor device 26. After a 3" high by 2.5' wide sludge cake pile 12 is formed on the belt 22, the control means 60 causes the second conveyor belt device 26 to move until the sludge cake pile 12 is centered between the first plate 28 and the second plate 30. The first conveyor belt device 24 is stopped during movement of the second conveyor belt device 26 to prevent sludge cake 12 from being deposited on the belt 22. Control of these functions is accomplished with a timer or optical limiters of the control means 60. Once the sludge cake 12 is centered, the second conveyor belt device 26 stops. Next, a hydraulic piston 38 is activated to start movement of the first plate 28 and sealing frame 40 downward towards the sludge cake pile 12. The bottom 48 of the sealing frame 40 initially contacts the belt 22 to confine the sludge cake pile 12. Further downward motion of the piston 38 causes the first plate 28 to compress the sludge cake pile 22 while the sealing frame remains stationary. The linkages 42 with springs 44 allow the first plate to move relative to the sealing frame 40. As the first plate 28 moves further downward compressing the sludge cake pile 12 with increasing pressure, the springs 44 extend causing the sealing frame 40 to be pushed with greater force into belt 22. Compression of the sludge cake pile 12 results in water being pressed out, therefrom. The water drains through the belt 22 and into the perforations 32 of the second plate 30. The drain 34 disposed beneath the second plate 32 collects the water and directs it to a suitable location for collection or disposal.

Once the sludge cake pile 12 is compressed to a predetermined maximum pressure, the control means 60 causes the piston 38 to cut out and retract from the sludge cake pile 12. The first plate 28 moves upward and the sealing frame 40 releases from the belt 22. The second conveyor belt 22 is then activated to move the compressed sludge cake pile 12 away from the pressure plate means 14 and to bring a new sludge cake pile 12 to the pressure plate means 14 for compression.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. An apparatus for dewatering sludge comprising:
   pressure plate means for compressing the sludge on a belt, said pressure plate means comprising a first plate disposed on a first side of the belt and a second plate disposed in an opposing relationship with the first plate on a second side of the belt, said pressure plate means comprising means for moving the first plate towards the second plate such that the sludge is compressed there between, said moving means fixedly attached to a top surface of the first plate; and
   means for confining the sludge within a predetermined area on the surface as the pressure plate means compresses the sludge; said confining means disposed adjacent to said pressure plate means, said confining means comprises a sealing frame which surrounds the perimeter of the first plate and seals against the belt to confine the sludge as the first plate moves to compress the sludge, said sealing frame directly attached to only the top surface of the plate with a plurality of independent linkages which independently apply a corresponding greater force against the frame to hold the sludge as the first plate applies greater force, said linkages remote from the moving means, said linkages applying a force to the sealing frame only from the action of the first plate.

2. A dewatering apparatus as described in claim 1 including means for transporting the sludge on a belt to the pressure plate means.

3. A dewatering apparatus as described in claim 2 including a belt filter press and said transporting means comprising a first conveyor belt device and a second conveyor belt device, said first conveyor belt device disposed adjacent to the belt filter press for transporting sludge from the belt filter press to the second conveyor belt, said second conveyor belt device disposed between said first conveyor belt device and said pressurizing plate means for transporting sludge from the first conveyor belt to said pressure plate means.

4. A dewatering apparatus as described in claim 2 wherein the transporting means further comprises means for stopping the belt when the portion of sludge is properly disposed between the first and second plates for compression.

5. A dewatering apparatus as described in claim 4 including a drain disposed below the second plate for collecting liquid from the perforations of the second plate.

6. A dewatering apparatus as described in claim 5 wherein the moving means further comprises means for releasing the first plate from the sludge when a predetermined pressure is achieved on the sludge.

7. A dewatering apparatus as described in claim 6 wherein a surface of the first plate in contact with the sludge is lined with a section of belt filter cloth.

8. A dewatering apparatus as described in claim 1 wherein each linkage comprises a spring connected to the first plate for biasing the sealing frame in a first direction relative to the first plate.

9. A dewatering apparatus as described in claim 1 wherein each linkage comprises an actuator for moving the sealing frame relative to the first plate.

10. A dewatering apparatus as described in claim 9 wherein each actuator comprises a piston.

* * * * *